(12) United States Patent
Zamorano Jones

(10) Patent No.: US 8,141,928 B2
(45) Date of Patent: Mar. 27, 2012

(54) RUBBER SHIELD PLATE FOR MINING DUMP TRUCKS OR FREIGHT TRAIN CARS

(75) Inventor: Claudio Devon Zamorano Jones, Santiago (CL)

(73) Assignee: Cauchos Industriales S.A., Santiago (CL)

( * ) Notice: Subject to any disclaimer, the term of this patent is extended or adjusted under 35 U.S.C. 154(b) by 157 days.

(21) Appl. No.: 12/122,809

(22) Filed: May 19, 2008

(65) Prior Publication Data

US 2009/0015028 A1    Jan. 15, 2009

(30) Foreign Application Priority Data

Jun. 15, 2007   (CL) .................................. 1760-2007

(51) Int. Cl.
*B60R 13/01* (2006.01)

(52) U.S. Cl. .................................. 296/39.2; 296/182.1

(58) Field of Classification Search ................ 296/39.2, 296/39.1, 181.1, 181.3, 183.2, 183.1; 298/24; 105/247; *B60R 13/01*
See application file for complete search history.

(56) References Cited

U.S. PATENT DOCUMENTS

| | | | | |
|---|---|---|---|---|
| 1,736,548 A | * | 11/1929 | Pye | 296/193.07 |
| 3,480,321 A | * | 11/1969 | Brandt et al. | 296/183.1 |
| 3,578,375 A | * | 5/1971 | Finefrock | 296/39.2 |
| 3,652,123 A | * | 3/1972 | Speers | 296/183.1 |
| 3,912,325 A | * | 10/1975 | Sudyk | 296/39.2 |
| 4,339,506 A | * | 7/1982 | Martin, Jr. | 428/519 |
| 4,352,520 A | * | 10/1982 | Stiglmaier et al. | 296/204 |
| 5,154,478 A | * | 10/1992 | Erickson et al. | 296/39.2 |
| 6,000,741 A | * | 12/1999 | Reynolds et al. | 296/39.2 |
| 6,237,980 B1 | * | 5/2001 | Miles et al. | 296/39.2 |
| 6,604,778 B2 | * | 8/2003 | Doshi | 296/181.3 |
| 6,799,402 B2 | * | 10/2004 | Faxe et al. | 52/390 |
| 7,618,075 B2 | * | 11/2009 | Boddie et al. | 296/39.2 |
| 2008/0084083 A1 | * | 4/2008 | Boddie et al. | 296/39.1 |

* cited by examiner

*Primary Examiner* — Glenn Dayoan
*Assistant Examiner* — Pinel Romain
(74) *Attorney, Agent, or Firm* — Hamre, Schumann, Mueller & Larson, P.C.

(57) ABSTRACT

A cover made of an elastomer material to act as protection for a steel hopper of very heavy-duty trucks and train cars. The cover protects the metallic hopper or cars from shocks from boulders and material of varied granulometry, in addition to providing protection against abrasion, unloading and corrosion. Fastening elements prevent the cover from loosing as a result of the dragging generated by the unloading of materials from the hopper. The protection provided by the cover increases equipment availability and decreases stopping time during repairs.

6 Claims, 8 Drawing Sheets

RUBBER SHIELD PLATE FOR MINING DUMP TRUCKS OR FREIGHT TRAIN CARS

FIELD OF APPLICATION

The present invention relates to the manufacture and design of a cover made of an elastomer material to act as a protection for steel hopper of very heavy-duty trucks and train cars, preferably used in mining applications. The purpose of this cover is protecting the metallic hopper or cars from shocks from boulders and material of varied granulometry, in addition to providing protection against abrasion, unloading and corrosion. It has fastening elements that prevent the plate from loosing as a result of the dragging generated by the unloading of the materials transported. This protection increases equipment availability and decreases stopping time during repairs.

DESCRIPTION OF PREVIOUS ART

The protection systems presently used are comprised of sacrifice steel sheets that, because of fractures resulting from impacts when loading the truck and abrasion caused by the load while being dumped, must be changed or repaired. This maintenance operation forces the truck or train car to be stopped for several hours as well as the disassembly of the of the hopper or car, an action that is not required when replacing a rubber plate, which is fastened to the hopper or car by means of an embedded high-strength bolt system having bolted fasteners having high mechanical strength and specific torque.

There also are equivalent protection systems for hopper trucks or train cars. The difference, in this case, lies in the present invention's special energy absorption feature against shocks and its strong fastening system. The present invention also contemplates the particular rubber mixing characteristics and a safe and strong easy-to-assemble fastening system. The possibility that the carry back residual material builds up is also decreased, making the full load to be transported and unloaded possible. Replacing the steel overthickness to resist wear by rubber makes it possible for the hopper truck and the train car to weigh less, lowering the net load transported, cutting operating costs and/or allowing greater loading capacity per round.

BACKGROUND OF THE INVENTION

The development of the present invention, entitled "Rubber shield plate for mine truck or train freight car", arises from observing production decreases and time losses in assembling and disassembling hoppers and cars for repairs and maintenance.

The present invention intends to solve the aforementioned problems, providing a strong, easy-to-install protection element, without the need of specialized personnel to replace it. It is easy to assemble, because it comprises a double-layer hard rubber plate, wherein one layer absorbs shock energy exerted by the load, and the second one holds traction efforts and keeps the plate in its original position. In addition, the interior of the layer has thread layers and a steel cable mesh along the entire length thereof, as may be seen in FIG. 6.

One of the applications of the shield plate is that of protecting the hopper on mine trucks, the manner and lay out of each one of the components may be seen in FIG. 6. The plate's front area will have a overhanging (larger width) that gets trapped by the bolted rubber fasteners to increase the traction of it when unloading the material; all of the rubber plate's and its fixtures must be in accordance with the dimensions of the hopper, which must be bolted thereto with rubber pieces having an embedded metallic angle that receives the fasteners that cross the floor to tightly bolt and apply torque on these parts, parts that are strong and that fix the perimeter of the plate to the floor, preventing the material transported to get inserted through the sides between the plate and the hopper or train car, as well as in the front part where strength is increased to resist the traction of the load, in addition to considering the hopper's central area. In case of fractures on the plate's surface, a repair kit used to circularly cut the area where the fractures starts, the area being then carefully cleaned, and a slightly higher and tapered insert is subsequently pressure placed, after a layer of adhesive c compatible with the plate material has been applied.

One other application for the rubber shield plate is for mine train cars, which uses the same structure as on mine hopper trucks, that is, considering the double hardness, the plies and the steel meshing, the dimensions being modified in accordance with those of the train cars, not only considering the floor area of the car, but also the inner walls thereof, wherein the same fastening and repair kit are considered.

DETAILED DESCRIPTION OF A PREFERRED EMBODIMENT

Figure 1:
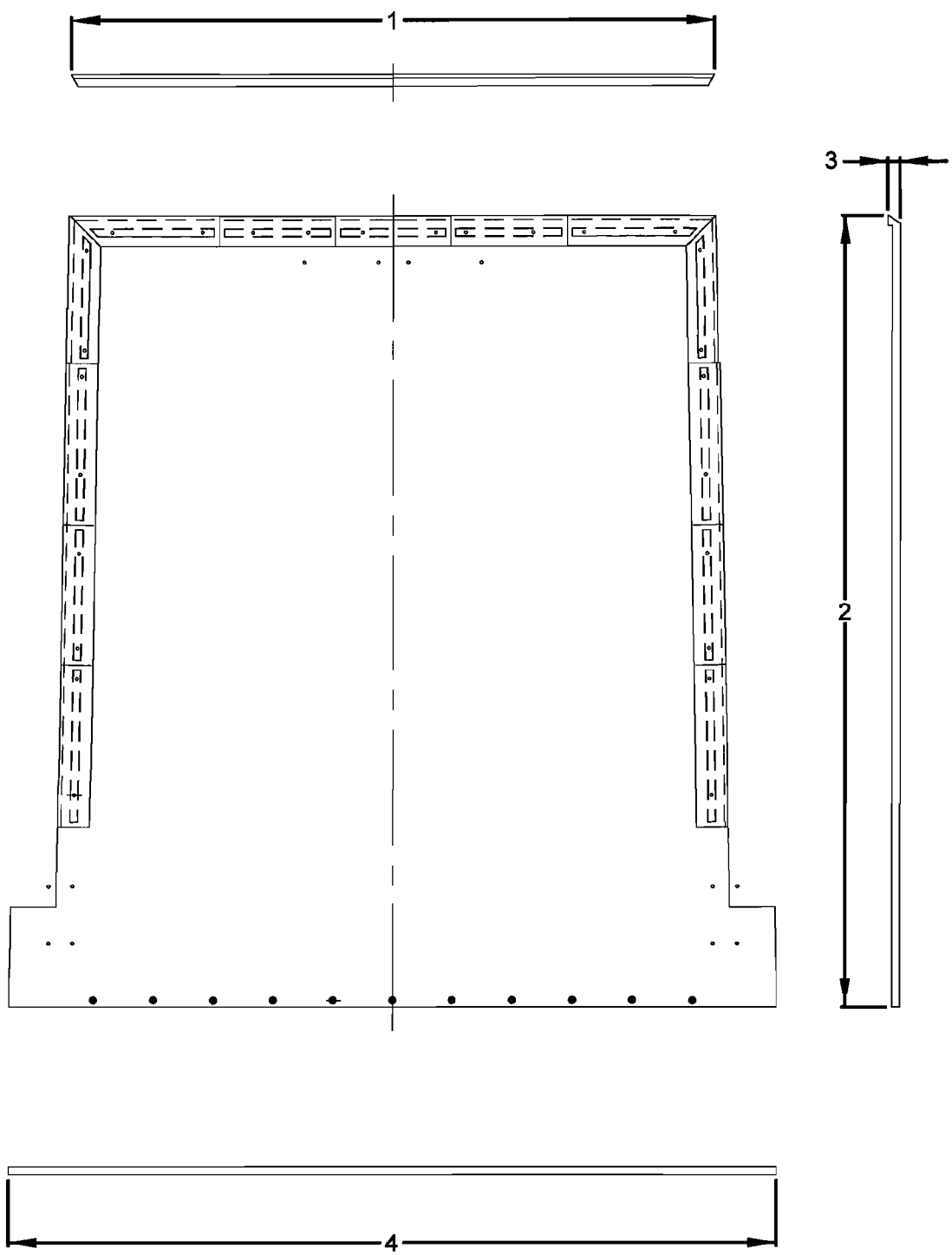
FIG. 1 shows a plan view and a sectional view of the plat with the holes, details of the plate's fasteners against the floor, and fastening system through a chassis.
Figure 2:
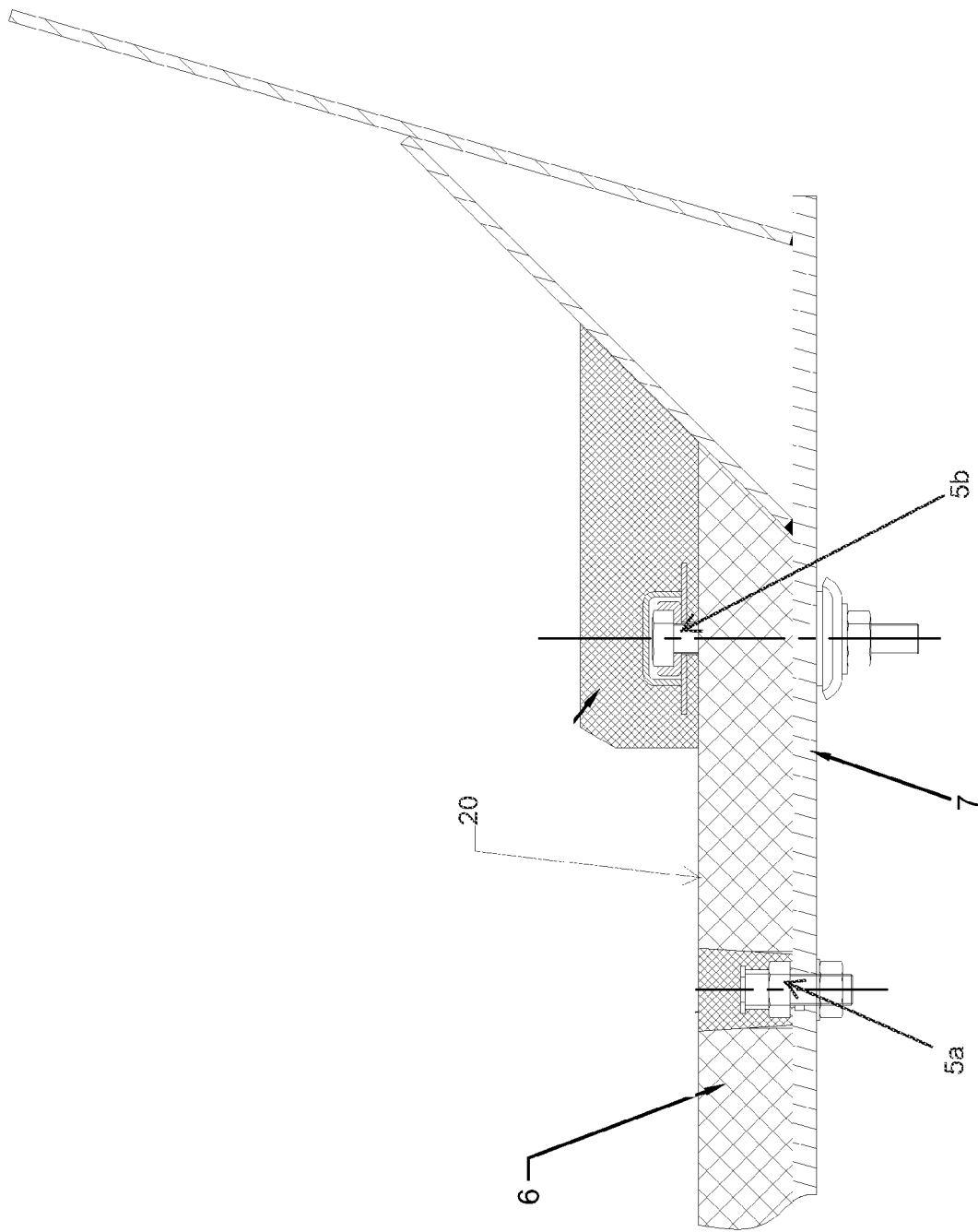
FIG. 2 shows the fastening system on the side area of the plate against the floor.
Figure 3:
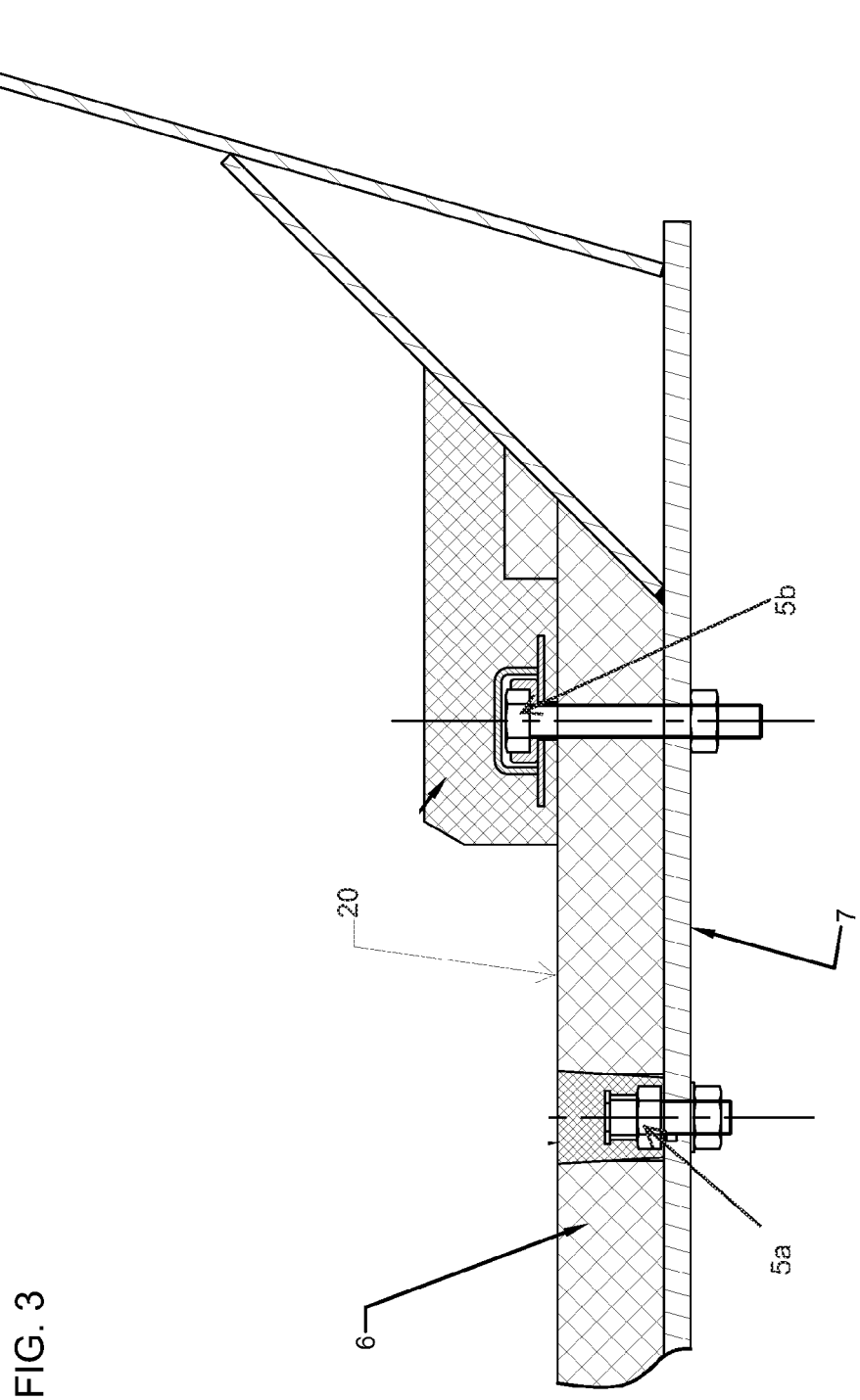
FIG. 3 shows the plate's fastening system against the floor on the front side.

A preferred embodiment of the present invention may be introduced to heavy-duty dump trucks, of between 100 and 400 tons, wherein the rubber plate is defined as shown in FIG. 1 by a width (1), a length, (2) a thickness, (3) and an unloading width (4), and is fastened to its front section and to its side sections, by way of rubber fasteners, wherein each one of them has embedded bolts with a shock absorbing system consisting of a rubber washer fixed by a cup washer which, in turn, is fixed by the metallic washer, which assures high mechanical strength and adequate torque, in addition to providing good rubber plate fastening against the existing floor (7), as is shown in FIG. 2. Due to different hopper designs, the assemblage of a pipe allowing the installation of anchor bolts for the possible presence of structural trusses, as well as freight train car structures, as shown in FIG. 3, must be considered.

As for the installation of the rubber fasteners (5a) and (5b), holes in the rubber plate (6) and in the existing floor (7) must be drilled, the dimension of these holes being in accordance with the size of the bolts to be used for an easy installation. The rubber shield plate (6) includes an upper surface (20), and the holes in the rubber shield plate are tapered outwardly from a juncture with the floor to the upper surface (20) so that the holes are larger in dimension at the upper surface than at the juncture and the rubber that fills the hole in the rubber shield plate is tapered.

Figure 4:
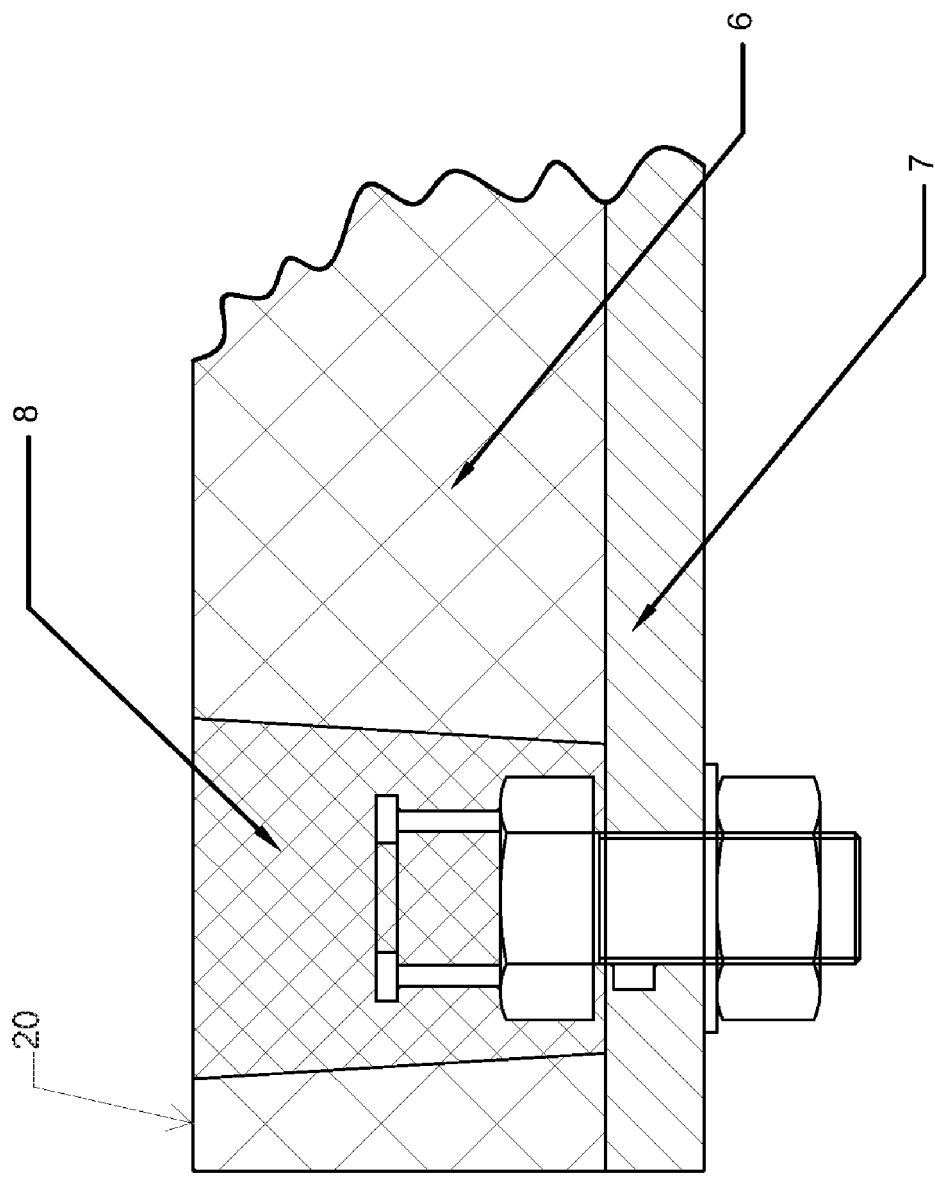
FIG. 4 shows the fastening system on the rear side of the plate.
Figure 8:
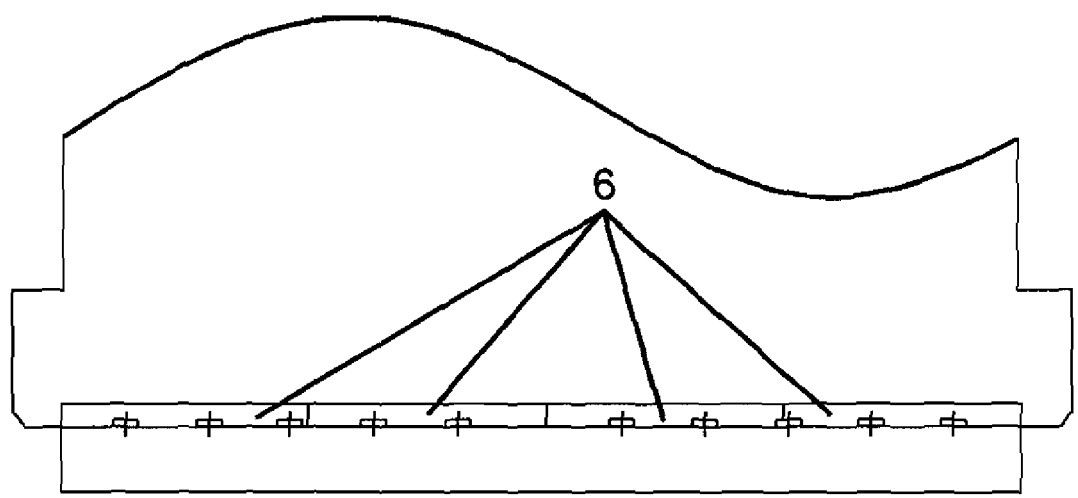
FIG. 8 shows an alternate anchoring system at the unloading area.

In the plate's rear area, this is fixed by way of embedded tapered rubber bots, which have a metallic core providing better grip to the plate (6) preventing it from disengaging. In addition, the rear fasten may be fixed by way if a anti-abrasive steel plate on which stud welds are fixed to then be bolted to the floor sheet through the rubber plate (6), leaving it between the steel plate and the floor plate, as is shown in FIG. 8. In order to install these fastens, holes must be drilled in the rubber plate (6) having a diameter slightly smaller than the fastener, so that this can be pressure inserted. The nut holding the rubber fasten must be applied a threaded joint glue to prevent it from loosening, as shown in FIG. 4. Two holes must be drilled in the existing floor (7), wherein one must be considerably smaller for the bolt fastening to enter through the mentioned hole, which will serve as an bolt anchoring system so that the bolt does not turn when applying the torque required; the other hole must be drilled in accordance with the size of the bolt for this to enter in adequately.

Figure 5:
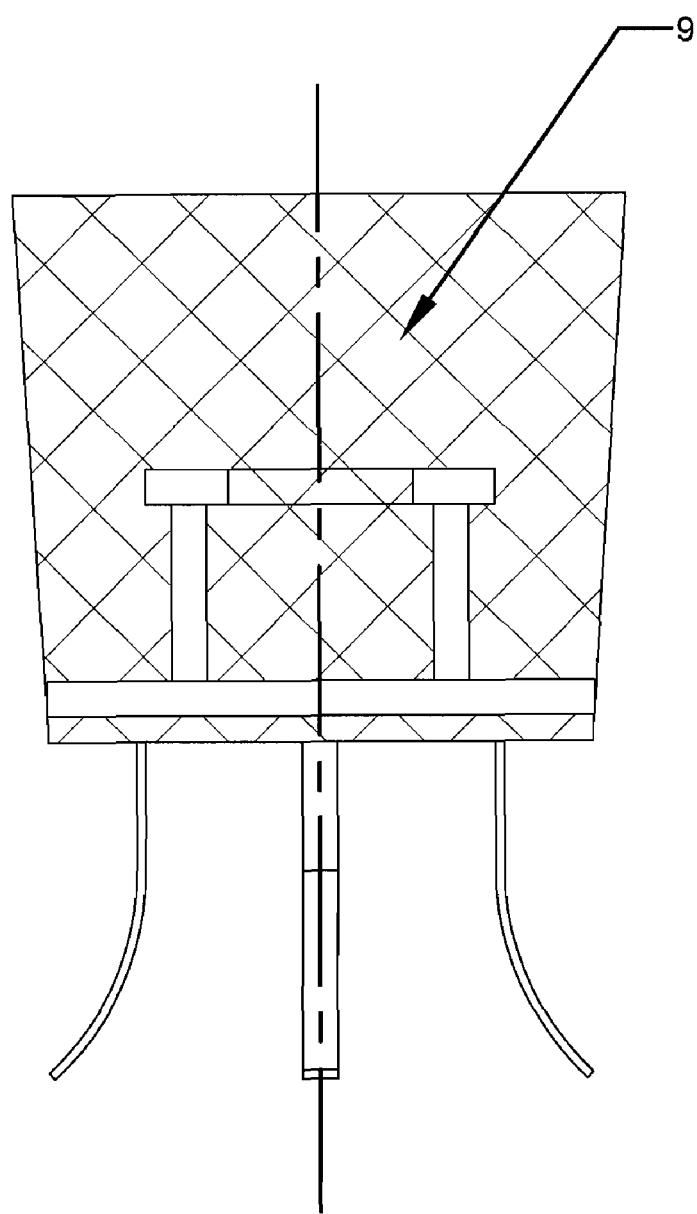
FIG. 5 shows the repair kit for the rubber plate.
Figure 6:
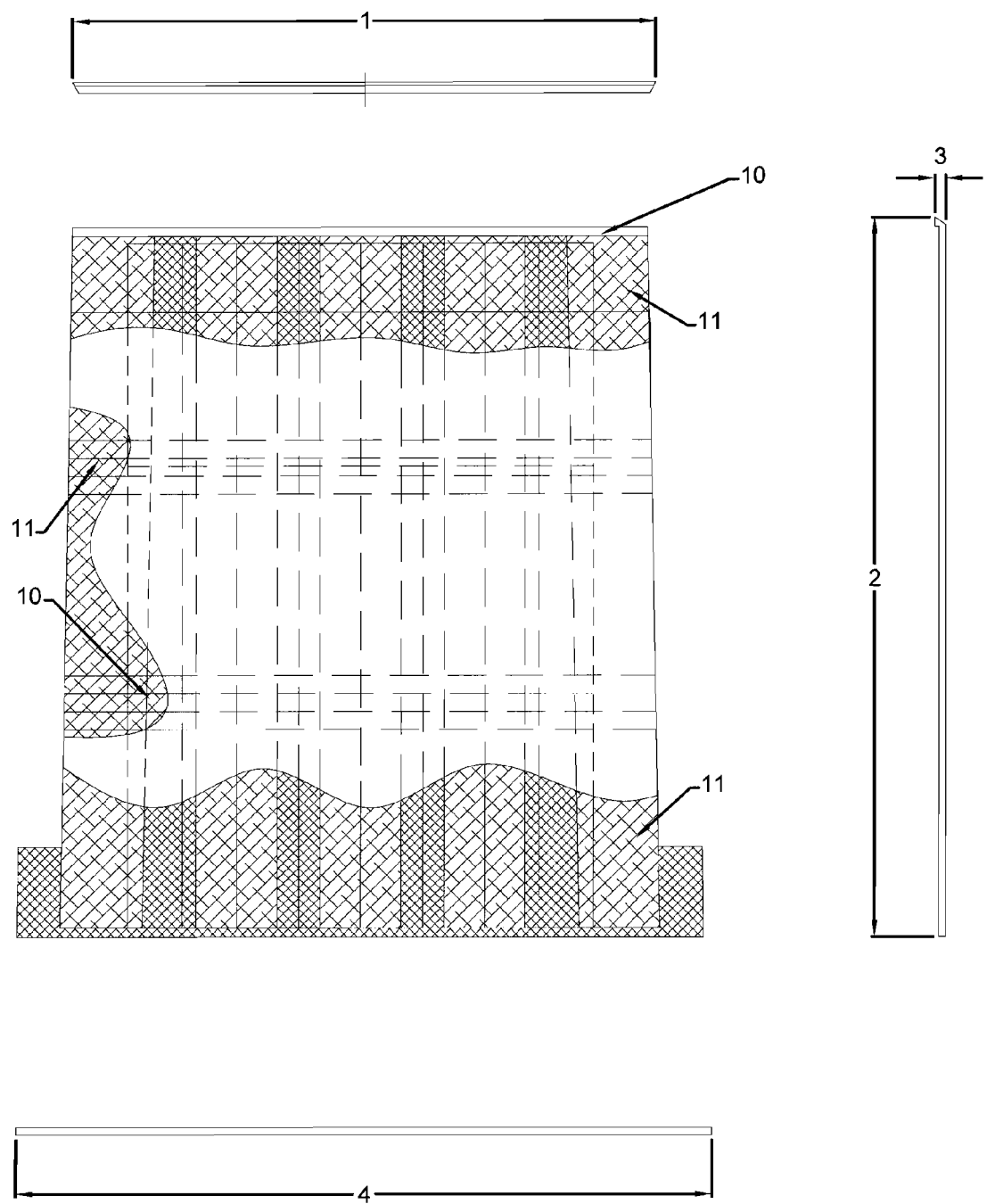
FIG. 6 shows the interior layout of the rubber plate.
Figure 7:
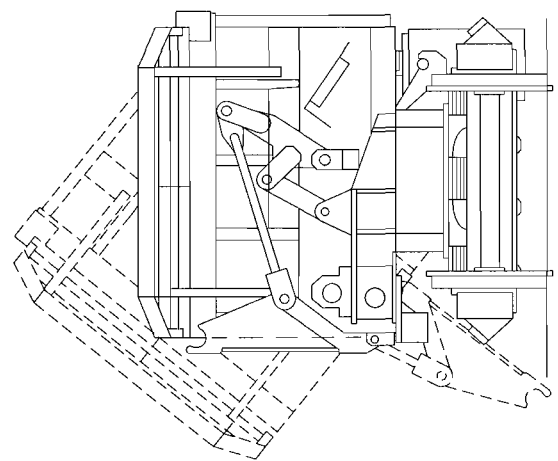
FIG. 7 shows the rubber plate for train cars.
Figure 7:
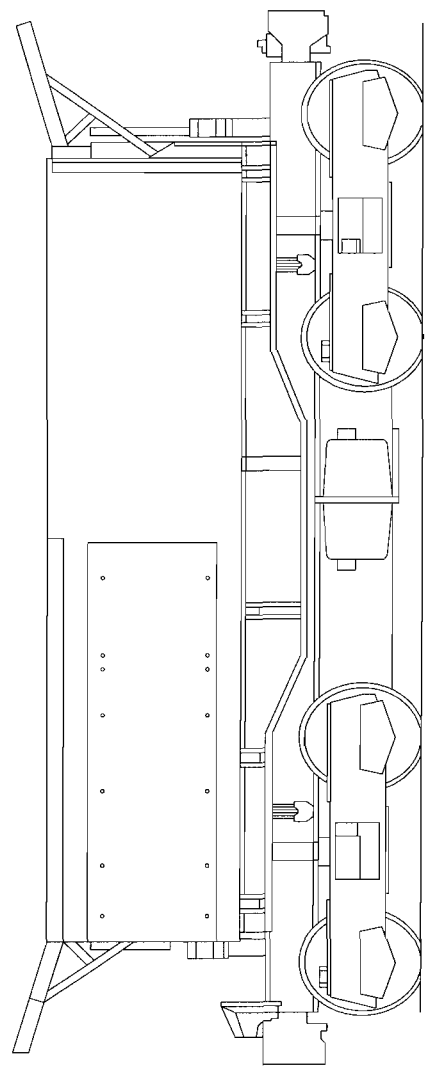

The repair kit (9) contemplated for the plate (6) has a standard and conical diameter. In order to install it, a hole being slightly smaller than the plate (6) must be made for it to enter at pressure, after an adhesive compatible with the material of the plate (6) has been applied, wherein the surfaces involved must have been carefully cleaned. The adhesive or adhesives to be used are to glue the kit's rubber surface with the plate itself, as well as the kit with the metallic surface of the hopper. The repair kit (9) has a metallic core with a gripping system that must be under the rubber plate, as shown in FIG. 5. It must be noted that if the damage exceeds the standard size, the plate must be replaced, since this can caused its detaching. The interior of the rubber plate is made up of rubber plies (10) and steel meshes (11), as shown in FIG. 6.

Another preferred embodiment for the rubber plate is that of using it on mine train cars, wherein cars with a freight capacity between 50 and 200 tons of material are preferably used, wherein the invention must be applied both to the floor and to the interior walls thereof, adapting to the different shapes and designs of existing freight cars. The way the different plates are fastened is similar to that applied on mining trucks, that is, by using rubber-embedded bolts, which are bolted to the car structure, in addition to considering the same repair kit, wherein the procedure for assembling both the fastening system and the repair kit is similar to that for hoppers or mine trucks.

What is claimed:
1. A hopper of a truck or train car comprising:
a floor;
a rubber shield plate fixed to the floor, the rubber shield plate including an upper surface;
a first plurality of totes formed in the floor and a second plurality of holes formed in the rubber shield plate, the first and second plurality of holes being aligned with each other;
bolts extending through the aligned first and second plurality of holes to secure the rubber shield plate to the floor, each of the bolts including a bolt head;
rubber covering the bolt heads with the bolt heads being embedded in the rubber;
wherein each of the bolt heads is disposed within the respective hole in the rubber shield plate and is disposed below the upper surface of the rubber shield plate, and the rubber fills the respective hole in the rubber shield plate, the rubber being flush with the upper surface of the rubber shield plate; and
the holes in the rubber shield plate are tapered outwardly from a juncture with the floor to the upper surface so that the holes are larger in dimension at the upper surface than at the juncture, and wherein the rubber that fills the respective hole in the rubber shield plate is tapered.
2. The hopper of claim 1, further comprising an additional bolt extending through the rubber shield plate and through the floor, the additional bolt including an additional bolt head that is disposed above the upper surface of the rubber shield plate, and rubber disposed on the upper surface of the rubber shield plate and embedding the additional bolt head.
3. The hopper of claim 1, wherein the holes in the floor have a diameter less than a diameter of the holes in the rubber shield plate.
4. The hopper of claim 1, wherein the rubber shield plate comprises rubber plies and steel meshes.
5. The hopper of claim 1, wherein the rubber filling the second plurality of holes in the rubber shield plate each have a length extending from a bottom surface of the rubber shield plate to the upper surface that is substantially equal to the length of each of the second plurality of holes in the rubber shield plate extending from the bottom surface thereof to the upper surface thereof.
6. The hopper of claim 1, wherein the rubber shield plate comprises a double layer of rubber, the rubber layers having different levels of hardness.

\* \* \* \* \*